UNITED STATES PATENT OFFICE.

NEW YORK IMPROVED ANTHRACITE COAL COMPANY, OF NEW YORK, N. Y., ASSIGNEE OF EDWARD J. DE SMEDT.

LAYING ASPHALT OR CONORETE PAVEMENTS OR ROADS.

SPECIFICATION forming part of Reissued Letters Patent No. 9,324, dated July 27, 1880.

Original No. 103,581, dated May 31, 1870. Application for reissue filed July 6, 1880.

*To all whom it may concern:*

Be it known that EDWARD JOSEPH DE SMEDT, of the city, county, and State of New York, assignor to the NEW YORK IMPROVED ANTHRACITE COAL COMPANY, invented a new and useful Improvement in Laying Asphalt or Concrete Pavements or Roads, designed to be applied or adopted more especially in those localities where gravel and broken stone cannot be readily obtained, as, for instance, in Savannah, Georgia, and vicinity, of which the following is a specification.

Sand, gravel, and broken stone are used in laying asphalt pavement and roads. Sand alone has not hitherto been used, on account of the difficulty in mixing the asphalt with it, as one part of the latter to about seven of the former is required, and the mixture thus made is too stiff or thick to be worked and the substances thoroughly incorporated together by a machine without heating the asphalt to a degree that seriously impairs its virtue for paving purposes.

His invention was designed to overcome this difficulty; and to that end he first mixed the asphalt, one part of the latter with about five parts of sand. These substances can be well mixed and incorporated together in the proportions last named under a comparatively moderate degree of heat, which will not in the least impair the character of the asphalt for paving purposes.

The surface on which the road or pavement was to be laid was properly graded, and he first put a thin layer of hot sand upon it, about half an inch in thickness; and upon this layer of sand he put a layer of hot sand and asphalt—that which was previously mixed—this last layer being about an inch in thickness. Over this layer of sand and asphalt he passed a hot roller and then applied a thin layer of hot sand half an inch thick, and over the latter a layer, an inch thick, of the hot asphalt and sand, which he rolled with a hot roller, as before. This he repeated until the desired thickness for the road or pavement was obtained.

By this process or mode of laying he obtained in the road or pavement the proper proportions of sand and asphalt without any difficulty whatever, and insured the proper or thorough incorporation of the sand and asphalt and sand layers, so that a homogeneous mass was obtained throughout.

In carrying out this invention it is important to observe that the asphalt used should be of that kind which will fuse at a moderate degree of heat—say, about 170° Fahrenheit; and if a harder or less fusible asphalt be used it must be incorporated with a substance that will soften it or allow it to fuse at a lower temperature. For this purpose he added to a hard asphalt a product of the distillation of asphalts or petroleum-oils, the heavy oils, termed the "paraffine" series, and also, where the smell is not objectionable, the residuum of the distillation of petroleum-oils; but he preferred to all those above-named oils the heavy crude petroleum-oils of a gravity not higher than 40° Baumé at 60° Fahrenheit.

Having thus described his invention, what we claim as new, and desire to secure by Letters Patent, is—

1. An asphaltic cement composed of asphalt and heavy crude petroleum-oils, or the heavy oils termed the "paraffine" series, or a product of the distillation of asphalt or petroleum-oils, or the residuum of the distillation of petroleum, when compounded in the manner substantially as described and for the purpose set forth.

2. An asphaltic concrete composed of an asphaltic cement, substantially such as herein described, and sand.

3. An asphaltic concrete composed of one part asphalt or asphaltic cement, such as described, and about five parts of sand, when compounded substantially in the manner set forth.

4. A concrete pavement composed of asphaltic concrete applied in two or more layers, with or without an intervening layer of sand.

NEW YORK IMPROVED ANTHRACITE COAL CO.,
By A. L. BARBER, *President*, [L. S.]
*Assignees of Edward J. De Smedt.*

Witnesses:
JOSEPH PAUL,
A. LANGDON.